United States Patent [19]
Julian

[11] Patent Number: 5,281,385
[45] Date of Patent: Jan. 25, 1994

[54] INJECTION MOLDING SYSTEM FOR THREADED TAMPER INDICATING CLOSURES

[75] Inventor: Randall K. Julian, Evansville, Ind.

[73] Assignee: Sunbeam Plastics Corporation, Evansville, Ind.

[21] Appl. No.: 964,515

[22] Filed: Oct. 21, 1992

[51] Int. Cl.⁵ ............................................... B29C 45/44
[52] U.S. Cl. ...................... 264/318; 264/334; 425/556; 425/438; 425/441; 425/DIG. 58
[58] Field of Search ............ 264/318, 328.1, 334, 264/336; 425/556, 577, 438, 441, DIG. 58

[56] References Cited

U.S. PATENT DOCUMENTS

| | | | |
|---|---|---|---|
| 3,737,277 | 6/1973 | Uhlig | 425/438 |
| 3,904,165 | 9/1975 | Den Boer | 249/67 |
| 4,496,302 | 1/1985 | Brown | 425/347 |
| 4,497,765 | 2/1985 | Wilde et al. | 425/DIG. 58 |
| 4,552,328 | 11/1985 | Dutt et al. | 249/67 |
| 4,595,547 | 6/1986 | Herr | 264/154 |
| 4,709,824 | 12/1987 | Thompson | 215/252 |
| 4,744,480 | 5/1988 | Luch et al. | 215/252 |
| 4,751,036 | 6/1988 | Barriac | 264/318 |
| 4,767,587 | 8/1988 | Towns et al. | 264/318 |
| 4,806,301 | 2/1989 | Conti | 264/318 |
| 4,904,435 | 2/1990 | Babcock et al. | 264/154 |
| 5,061,168 | 10/1991 | Fox | 425/190 |
| 5,067,891 | 11/1991 | Julian et al. | 425/533 |

Primary Examiner—Jill L. Heitbrink
Attorney, Agent, or Firm—Gifford, Groh, Sprinkle, Patmore and Anderson

[57] ABSTRACT

A method of injection molding a container cap with a precision thread having a tamper indicating band depending from the bottom of the cap skirt. Collet jaws form at least a frangible connection between the bottom of the cap skirt and the top of the tamper indicating band, and these jaws are moved radially outward specified amounts during the molding process to provide clearance for stripping an inwardly directed retaining element on the band from the core and for ejection of the finished cap.

26 Claims, 6 Drawing Sheets

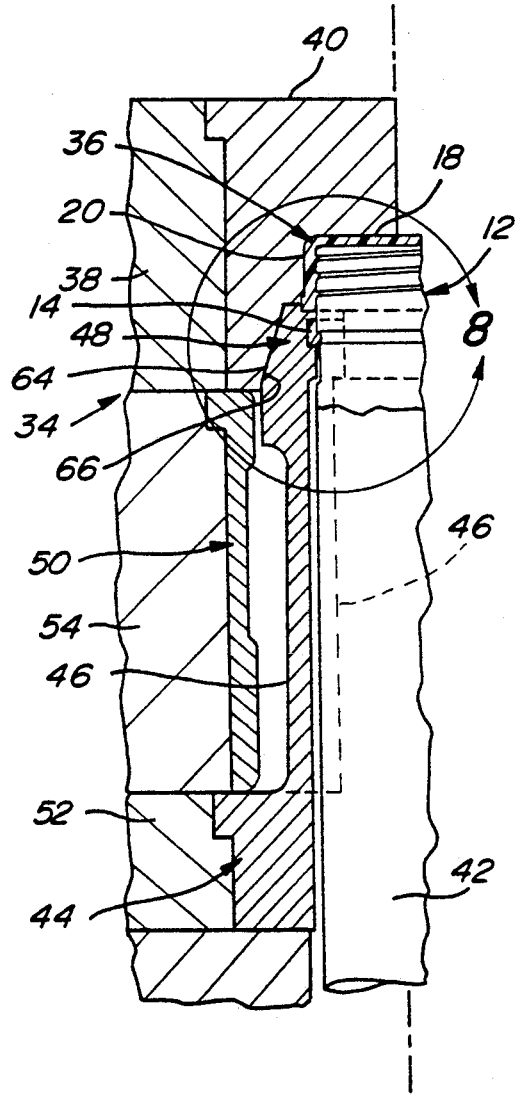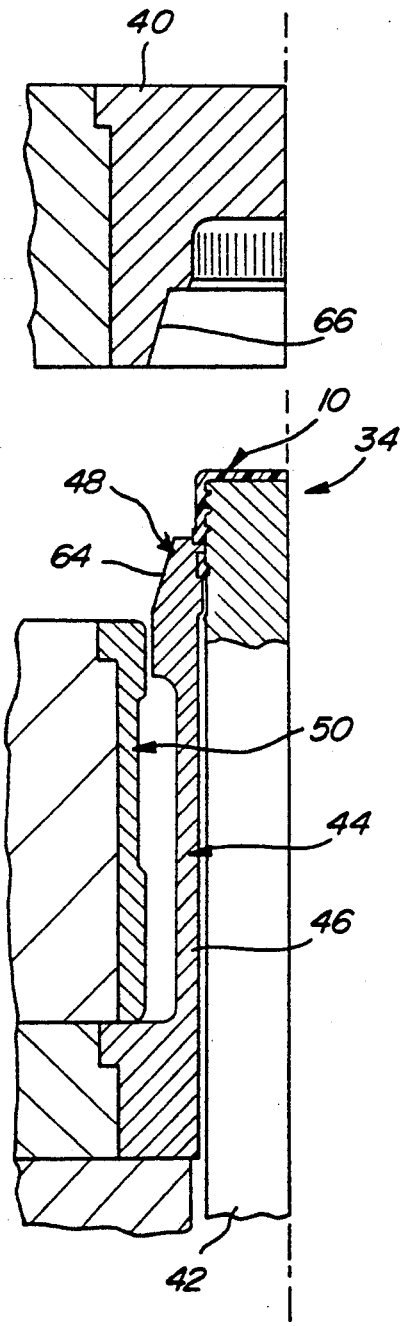
Fig-3
Fig-4

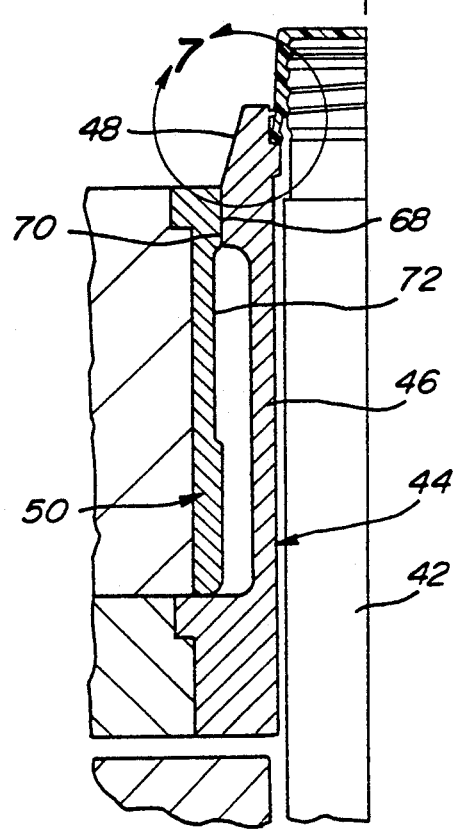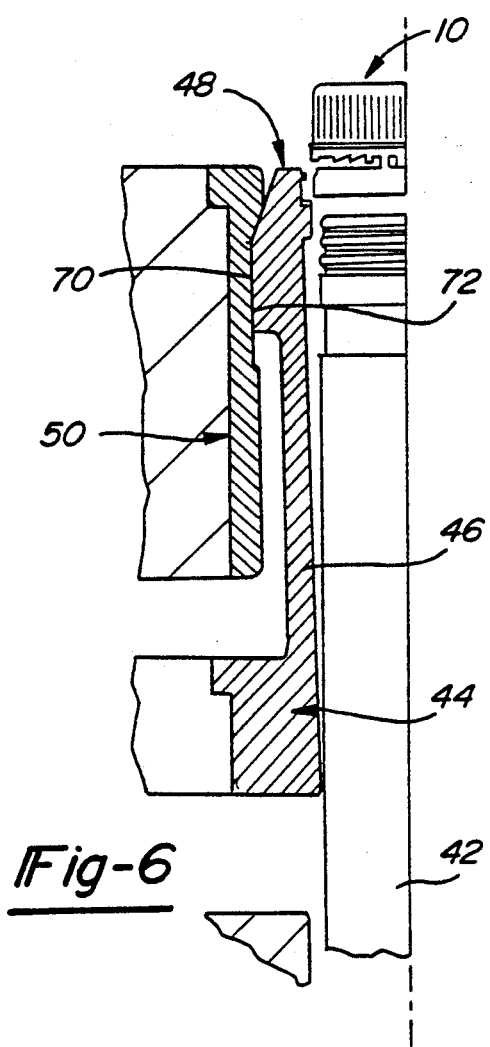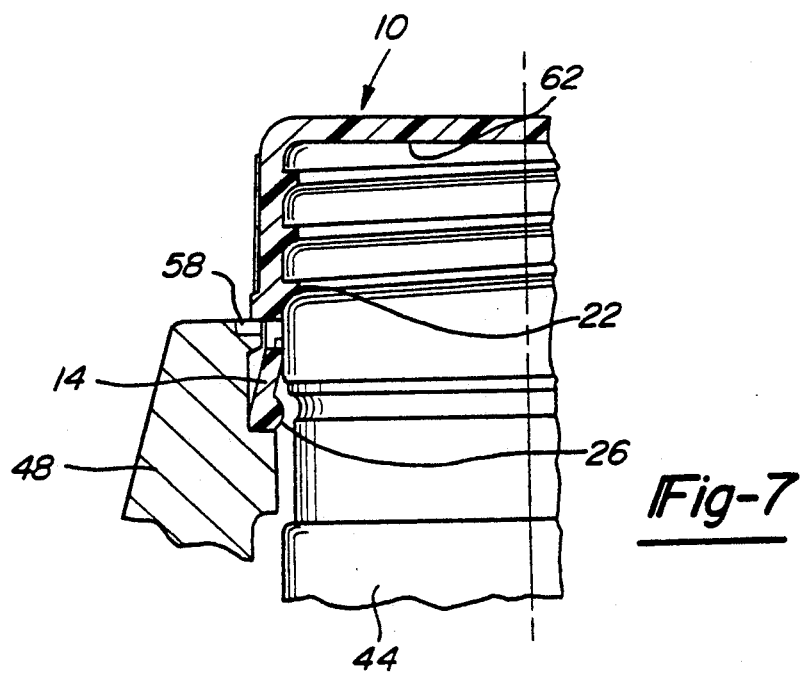

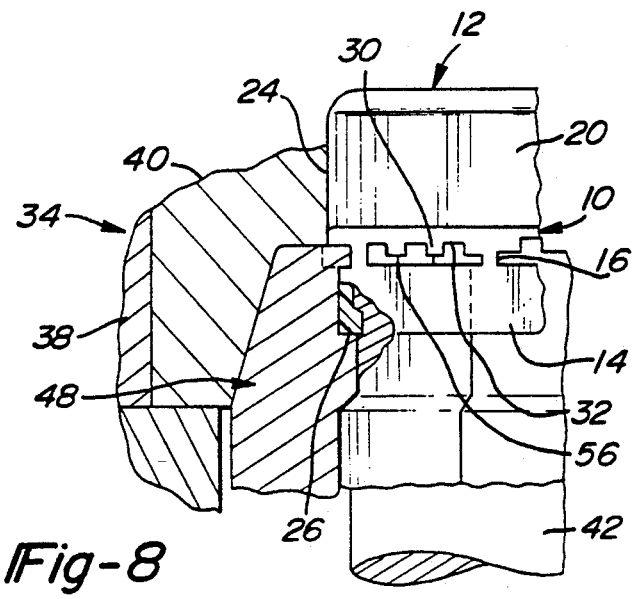
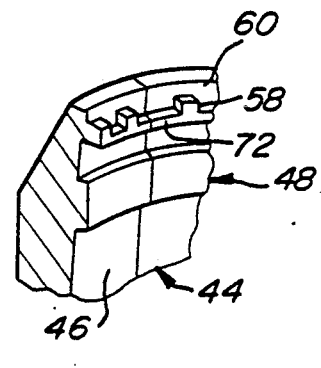
Fig-8
Fig-9
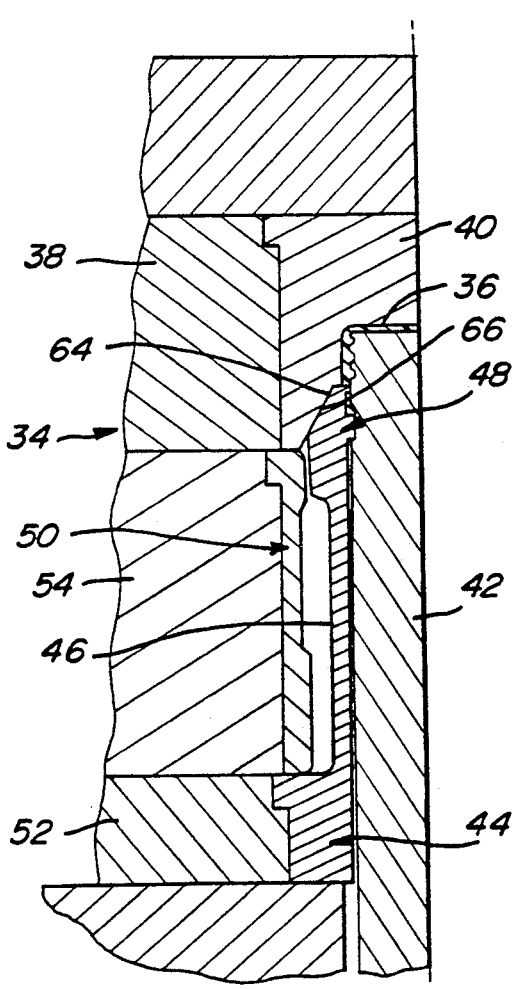
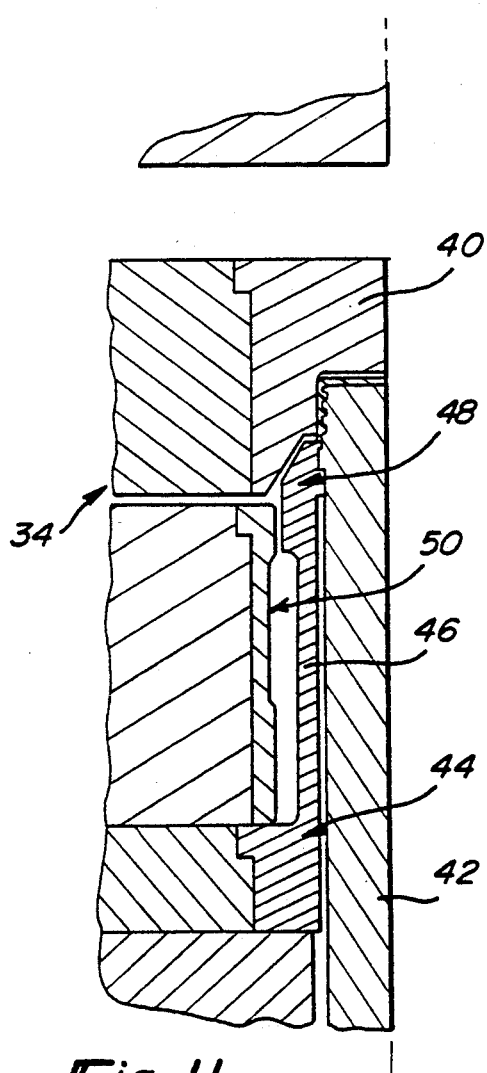
Fig-10
Fig-11

INJECTION MOLDING SYSTEM FOR THREADED TAMPER INDICATING CLOSURES

BACKGROUND OF THE INVENTION

1. Field of the Invention

This invention relates to a method for forming container closures. More particularly, this invention relates to a method for injection molding threaded tamper indicating closures.

2. State of the Art

Many threaded closures, including tamper indicating closures having a threaded cap and a tamper, indicating band joined to the bottom of the cap by a frangible connection, are molded with a rounded thread so that the molding core can be stripped from the molded cap by axial movement, jumping the thread forming portion of the core over the internal cap thread.

Where a precision thread has been required having a sharply defined thread apex, axially split cores have been used mandating closure design where the cap skirt of the closure is at least twice as long as a cap having jump threads in order to accommodate unthreading splines or axially extending teeth. This can be seen in FIG. 1 of the closure described in U.S. Pat. No. 4,572,387 where the threaded cap 12 of closure 10 has a first skirt portion 18 having a precise internal thread 20 and a second skirt portion 24 having unscrewing teeth or spline receiving grooves 30. A splined portion of the core remains stationary, to be engaged with teeth 30, to prevent rotation of the closure as a second separate portion of the core forming the internal threads 20 is rotated in an unthreading direction.

SUMMARY OF THE INVENTION

The present invention provides a new method of molding a tamper indicating band with a precision internal thread on the cap of the closure, overcoming problems inherent in the prior art. The closure to be molded has a tamper indicating band joined to the bottom of the cap by a frangible connection as is well known in the art. The tamper indicating band has an inwardly directed retaining element which cooperates with a corresponding outwardly directed retaining element on the neck of the container. As is also well known, the retaining element can be in the form of a circumferentially continuous or a segmented bead, ratchet teeth, folding fingers or other similar stop elements. When the closure is unthreaded, the band is retained on the container neck by the retaining element, putting stress on the frangible connection to break it as the cap is unthreaded from the container neck.

The new method includes the following steps:

providing a cavity mold defining an exterior portion of the cap;

providing a core defining an internal thread of the cap and an inwardly directed retaining element on the tamper indicating band;

providing a circumferential array of radially movable jaws concentrically around the core so that when the jaws are in a radially innermost position they define the exterior surface and bottom of the tamper indicating band, the bottom of the cap and the frangible connection between the tamper indicating band and the bottom of the cap;

axially moving the core and the array of jaws into the cavity mold;

moving the jaws into their radially innermost position and locking the jaws in this position completing delineation of a molding cavity for the closure;

injecting plastic material into the molding cavity to form the closure;

moving the jaws radially outward a predetermined amount to provide clearance for stripping of the retaining element on the tamper indicating band from the core;

rotating the core in an unthreading direction while restraining rotation of the closure;

axially advancing the array of jaws while maintaining contact between each of the jaws and the bottom of the tamper indicating band and the bottom of the cap to strip the cap from the core as the core is being rotated; and moving the jaws radially outward a further amount more than the predetermined amount and ejecting the closure.

The cavity mold is preferably provided with a internal frusto-conical surface and each of the array of jaws is provided with an external frusto-conical surface so that during axial movement of the jaws into the cavity mold, the jaws can move into their radially innermost position to lock in this position for defining the molding cavity. The radially movable jaws can be biased inwardly or outwardly, and in a preferred embodiment a collet is provided having axially extending fingers which form the circumferential array of the movable jaws. When the collet jaws are spring biased outwardly, axial movement into the cavity mold will move the jaws inwardly to their molding position by the coaction of the frusto-conical surfaces. Axial movement between the cavity mold and collet will allow the jaws to spring outwardly, and this outward movement can be limited to the predetermined amount by a sleeve surrounding the collet. Axial movement of the sleeve relative to the collet a further amount can provide clearance for further movement of the jaws radially outward for ejection of the molded closure.

In another embodiment where the collet jaws are spring biased inwardly, their inward movement to define the molding cavity is accomplished by the spring bias and their movement outwardly can be obtained by axial movement of the core provided with a camming surface which acts radially outward against the collet jaws. In this case, the movement of the jaws outwardly a predetermined amount can be controlled by the camming surface itself.

In a preferred embodiment the jaws further define axially extending unthreading teeth on the bottom of the cap which remain engaged with the jaws as the jaws are moved outwardly the predetermined amount so that such engagement restrains rotation of the closure during unthreading of the core. A substantial portion of the exterior wall of the cap can be formed by the collet jaws.

In another preferred embodiment, the cavity mold defines a circumferential array of axially extending ribs on the exterior portion of the cap. These ribs remain engaged with the cavity mold, restraining rotation of the closure during unthreading of the core.

BRIEF DESCRIPTION OF THE DRAWING

The advantages of the present invention will be more apparent from the following detailed description when considered in connection with the accompanying drawing wherein:

FIGS. 3-6 show a molding machine used to practice a collet unthreading embodiment of the molding method of this invention in successive stages of operation in molding closures of the type shown in FIG. 1 with FIGS. 7-9 showing the machine details on an enlarged scale wherein:

FIG. 3 is a cross-sectional view of the molding machine in a closed position with plastic having been injected into the molding cavity defined by the cavity mold, core and collet jaws, the collet jaws being held in their closed position by the cavity mold and the collet sleeve being radially spaced from the collet;

FIG. 4 is a cross-sectional view of the molding machine of FIG. 3 with the core, collet and collet sleeve moved away from tile cavity mold the closure having been formed and being retained by the core and collet, and with the collet still closed but free to expand radially outward;

FIG. 5 is a cross-sectional view of the molding machine of FIG. 3 with a collet expanded a predetermined amount from the position in FIG. 4 providing clearance for stripping of the inwardly directed bead on the tamper indicating band from the core, the collet jaws being held in this position by an upper portion of the collet sleeve, and with the collet jaws maintaining contact with the axially extending unscrewing teeth formed at the bottom of the cap skirt to prevent rotation of the closure as the core is unthreaded, and with this contact of the collet with the bottom of the cap skirt and also with the bottom of the tamper indicating band, the collet will act to strip the closure from the core as the collet is advanced in synchronization with the unthreading of the core;

FIG. 6 is a cross-sectional view of the molding machine of FIG. 3 with the core completely unthreaded from the closure and the collet sleeve moved relative to the collet which has allowed the collet to expand a further amount from the predetermined amount shown in FIG. 5 so that it is out of contact with the closure, ejecting the closure from the machine;

FIG. 7 is an enlarged view partially in section of the encircled portion 7 of FIG. 5 showing the collet expanded a predetermined amount providing clearance so that the bead at the bottom of the tamper indicating I)and can be stripped from the core while the collet jaws maintain contact with the unthreading teeth formed at the bottom of the closure cap;

FIG. 8 is an enlarged view partially in section of the encircled portion 8 of FIG. 3 showing the collet in its fully closed position after plastic has been injected into the mold to form the closure with unthreading teeth at the bottom of the cap, and also broken away to show the formation of an inwardly directed bead at the bottom of the tamper indicating band by the core;

FIG. 9 is a fragmentary enlarged view showing a portion of two adjacent collet jaws in their closed position and showing the jaw projections which form the teeth at the bottom of the closure cap and open window areas between spaced axially extending frangible webs;

FIGS. 10-13 show the molding machine used to practice a cavity unthreading embodiment of the molding method of this invention in successive stages of operation in molding closures of the type shown in FIG. 2 with FIG. 14 showing molding machine details on an enlarged scale wherein:

FIG. 10 is a cross-sectional view of the molding machine in a closed position with plastic having been injected into the molding cavity defined by the cavity mold, core and collet jaws, the collet jaws being held in their closed position by the cavity mold and the collet sleeve being radially spaced from the collet;

FIG. 11 is a cross-sectional view of the molding machine of FIG. 10 with the core, collet and collet sleeve moved axially away from the cavity mold a sufficient amount to allow the collet to open a predetermined amount;

FIG. 12 is a cross-sectional view of the molding machine of FIG. 10 with the collet expanded a predetermined amount from the position shown in FIG. 11 providing clearance for stripping of the inwardly directed bead on the tamper indicating band from the core, the collet jaws being held in this position by an upper portion of the collet sleeve, and with the collet jaws maintaining contact with the bottom of the cap skirt and the bottom of the tamper indicating band so that as the collet is advanced in synchronization with unthreading of the core it will act to strip the closure from the core; axially extending ribs on the closure maintain contact with axially extending rib forming projections in the cavity mold to prevent rotation of the closure as the core is unthreaded;

FIG. 13 is a cross-sectional view of the molding machine of FIG. 10 with the core completely unthreaded and with the core, collet and collet sleeve moved axially away from the cavity mold. The collet sleeve has been moved axially relative to the collet which has allowed the collet to expand a further amount from the predetermined amount shown in FIG. 12 so that it is out of contact with the closure, ejecting the closure from the machine;

DETAILED DESCRIPTION OF THE PREFERRED EMBODIMENTS OF THE INVENTION

Figure 1:
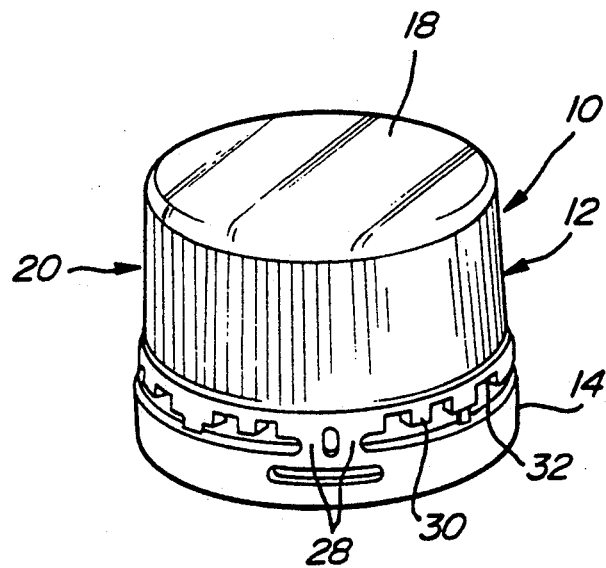
FIG. 1 is a perspective view of a tamper indicating threaded closure manufactured by the collet unthreading method of this invention.
Figure 2:
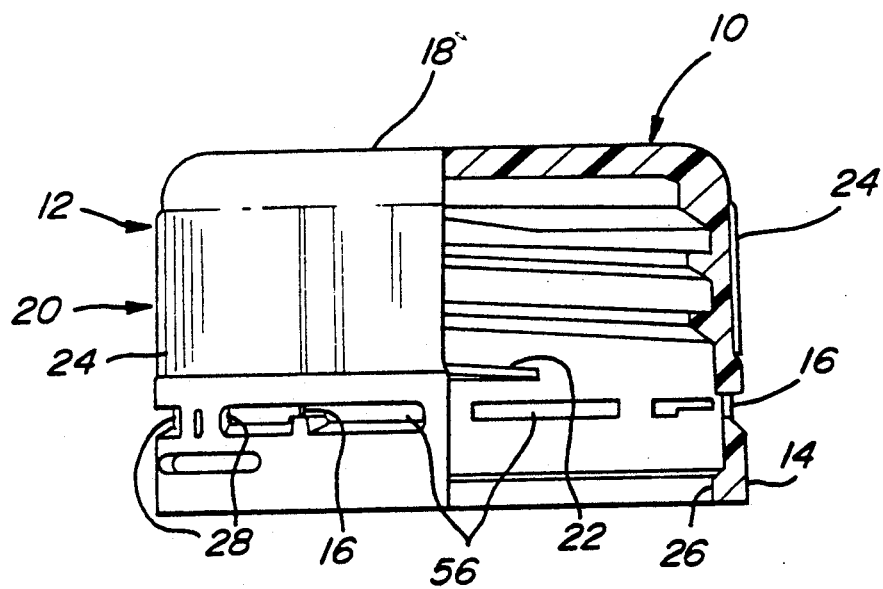
FIG. 2 is a side elevation of a tampering indicating closure manufactured by the cavity unthreading method of this invention.

Referring to FIGS. 1 and 2, the threaded closure 10 formed by the methods of the present invention includes a cap 12 and a tamper indicating band 14 attached to the bottom of the cap by a number of circumferentially spaced axially extending frangible webs 16 as seen in FIG. 2. The cap 12 has a top 18 and an axially extending skirt 20 formed with internal precision threads 22 and external ribs 24 which provide the user a grip for unthreading the closure. The tamper indicating band has an inwardly directed element shown in FIG. 2 as a continuous bead 26. In the particular embodiments shown in FIGS. I and 2, the band 14 is also connected to the bottom of the cap skirt 20 by a pair tether webs 28.

In use, the closure 10 is threaded onto a threaded container neck with the bead 26 snapping over a complimentary flange on the container neck. When the cap is rotated in an unthreading direction, the bead 26 retains the band 14 on the neck fracturing the frangible webs 16 to provide evidence of initial opening or tampering of the container closure package. The tether webs 28 retain the tamper indicating band 14 attached to the cap 12 after fracture of the webs 16. This closure structure is the subject of my co-pending patent application, Ser. No. 877,812, filed May 4, 1992, now U.S. Pat. No. 5,246,125. In other embodiments, the tether webs may be omitted so that when the frangible webs 16 are broken, the band 14 remains on the container neck. Also in other embodiments the continuous bead 26 as shown in FIG. 2 can be replaced by a segmented bead or other retaining element such as ratchet teeth.

In the embodiment shown in FIG. 1, the bottom of the cap is formed with circumferentially spaced axially extending unthreading teeth 30 and slots 32. These teeth 30 prevent rotation of the closure 10 as a core forming the threads 22 is unscrewed from the cap during the molding procedure.

In the closure of FIG. 2 rotation of the closure 10 is prevented when the core is being unthreaded by engagement of the axially extending ribs 24 with the cavity mold projections forming them.

Referring to FIGS. 3-6 and the enlarged portions of these FIGS. shown in FIGS. 7-9, a collet unthreading embodiment of the molding method is sequentially shown as practiced in the molding machine 34.

In FIGS. 3 and 8 the molding machine is shown in the closed position with all of the elements of the mold positioned to define the molding cavity 36 in which the closure 10 has been formed by injection of plastic into the cavity. As is conventional, the cavity plate 38 and its cavity mold or molds 40 are stationary with the plastic being injected through the cavity mold into the molding cavity 36. While a single molding cavity and its associated parts are shown throughout the drawing, it will be appreciated that the cavity plate 38 may accommodate a number of vertically spaced rows of horizontally spaced cavity molds. The moving portion of the molding machine 34 includes the core 42, collet 44 having a plurality of axially extending fingers 46 defining a circumferential array of radially movable jaws 48, and a collet sleeve 50.

It will be appreciated that many details, well known in the art, have been eliminated for both the stationary and moving elements of the molding machine 34 to simplify the showing and emphasize the components used in the method of the invention. Likewise, it is the relative movement between components that accomplishes the steps of the molding method rather than which components are stationary and which are moved. On the stationary side, a single cavity mold 40 and cavity plate 38 are shown, but the sprue and gate system for injecting the molten plastic into the molding cavity 36 is omitted. With a multi-cavity mold, there would be at least an additional stationary runner plate for the sprue system.

In a like manner, on the moving side, collet plate 52 and collet sleeve plate 54 are shown, but a core plates for imparting axial movement to the core has been omitted in order to shorten the views. Similarly, additional core plate for imparting rotation to the core have been omitted such as spaced roller bearing core support plates and an intermediate plate containing a rack for coaction with a pinion on the core (not shown).

Other well known elements are also omitted such as cams, etc. to impart axial motion to the col let when it acts as a stripper against the closure cap and band bottoms in synchronization with the axial movement of the core imparted by rotation of the core. As best seen in FIG. 3, with the molding machine in its closed position, the cavity mold 40 forms a substantial portion of the external surface of cap 12, namely top 18 and skirt 20. Gripping ribs 24, as best seen in FIG. 8 are also formed by the cavity mold 40 on cap skirt 20.

As best seen in FIGS. 3, 8 and 9, the collet jaws 48 form the exterior surfaces of the tamper indicating band 14, namely the band side wall, bottom and top. Collet jaws 48 also form the frangible connection between the top of the ))and 14 and the bottom of the cap skirt 20, namely, open window areas 56 and frangible webs 16 by inwardly directed jaw projections 72. Jaws 48 also form collet unthreading teeth 30 with the spaces 32 between the teeth being formed by inwardly directed jaw projections 58. Note in FIG. 9 that a portion of the cap skirt 20 is formed by the top interior wall portion 60 of the jaws 48. It will be appreciated that the top of the collet jaws can be axially extended to form substantially all of the cap skirt 20 with the axially extending ribs 24, reducing that portion that is shown being molded by cavity mold 40. This axial extension of jaws 48 is shown in phantom in FIG. 15 at 48'.

As best seen in FIGS. 3, 7 and 8, the core forms the interior of the closure 10, namely, cap top interior surface 62 and thread 22, best seen in FIG. 7, and band 14 inside wall with inwardly projecting bead 26, best seen in FIG. 8.

Collet jaws 48 have a tapered exterior surfaces 64 which cooperates with an internal tapered surface 66 in cavity mold 40, as seen in FIGS. 3 and 4, to lock the mold in its closed position. With the collet fingers 46 being spring biased outwardly in the embodiment of FIGS. 3-7, these cooperating tapered surfaces 64 and 66 will move the jaws 48 into their radially innermost position as the collet 44 is moved axially from a separated position such as in FIG. 4 to its closed position in FIG. 3.

When the injection step has been completed as shown in FIG. 3, the core 42, collet 44 and collet sleeve 50 are moved axially away from cavity mold 40 with the closure 10 being retained between core 42 and collet jaws 48 as seen in FIG. 4. This allows the jaws 48 to move radially outward by the spring bias in collet fingers 46 from the position shown in FIG. 4 to the position shown in FIG. 5. Collet sleeve 50 has been maintained aligned with collet 44 so that upper cylindrical sleeve surface 68 acting against cylindrical external collet jaw surface 70 limits the outward movement of the jaws 48 to a predetermined amount providing clearance for stripping the inwardly directed band bead 26 from the core 44 shown in exaggerated position in FIG. 7. During this outward movement of the jaws 48, the jaw projections 58 remain in contact with threading teeth 30 to prevent rotation of the closure 10 as the core 44 is rotated in an unthreading direction.

During the unthreading step, the collet jaws in addition to being held in contact with the bottom of cap skirt 20 through teeth 30 are kept in contact with the bottom of the tamper indicating band 14, and the collet is advanced in synchronization with the axial movement of the core 42 as it is being rotated to provide stripping of the closure 10 from the core 42.

When the core 42 has been completely unthreaded from the closure 10, the collet sleeve 50 is moved axially relative to collet 44 to allow the jaws 48 to move radially outward a further amount limited by contact of the cylindrical collet surface 70 with cylindrical sleeve surface 72 ejecting the closure 10 as shown in FIG. 6.

Figure 12:
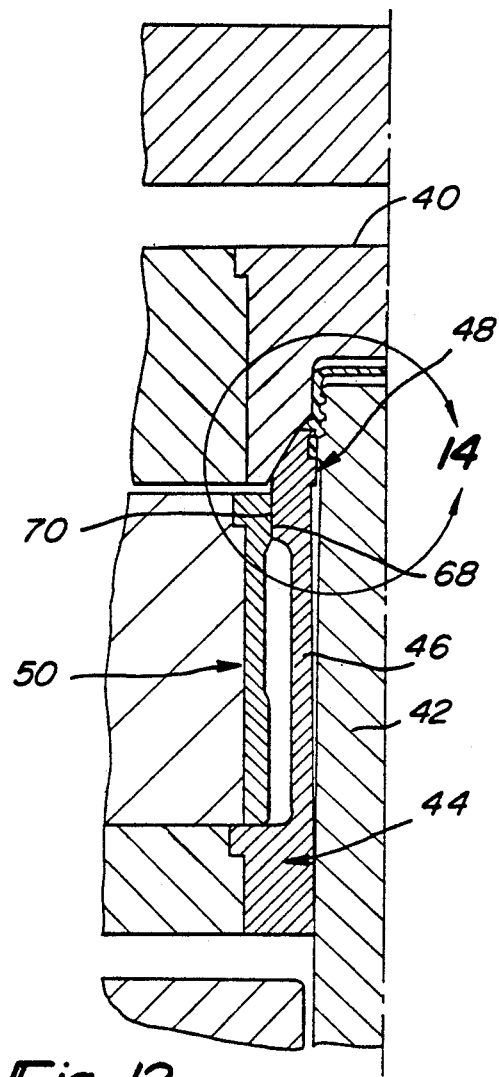

In the cavity unthreading method of molding illustrated in FIGS. 10-13, the components of molding machine 34 are essentially the same as those of FIGS. 3-6 with the exception that the collet jaws 48 are not configured to form unthreading teeth at the bottom of the cap skirt 14. In the cavity unthreading method the axially extending ribs 24 formed on cap skirt 20 are utilized to restrain rotation of the molded closure 10 during unthreading of the core 42. Thus the overall molding sequence is changed from axially displacing the moving components completely away from the stationary cavity mold 40 as depicted from FIG. 3 to FIG. 4 to a sequential or gradual axial movement away from the cavity mold as depicted in FIGS. 10-12 in order to maintain the cavity mold rib forming projections in contact with cap skirt ribs 24 to keep the closure 10 stationary as the core 42 is unthreaded.

In FIG. 10 the molding machine 34 is shown in its closed position. The collet jaws 48 are locked in the cavity mold 40 by cooperating external tapered surface 64 on collet jaw 48 and internal tapered surface in cavity mold 40. This closed position defines the molding cavity 36. In FIG. 11 the molding machine 34 has been opened by movement of the moving elements core 42, collet 44 and collet sleeve 50 a short axial distance from the cavity mold 40 to permit the jaws 48 to expand outwardly a predetermined distance to provide sufficient clearance for jumping the internal bead 26 or other inwardly directed stop element from the core 42.

Figure 14:
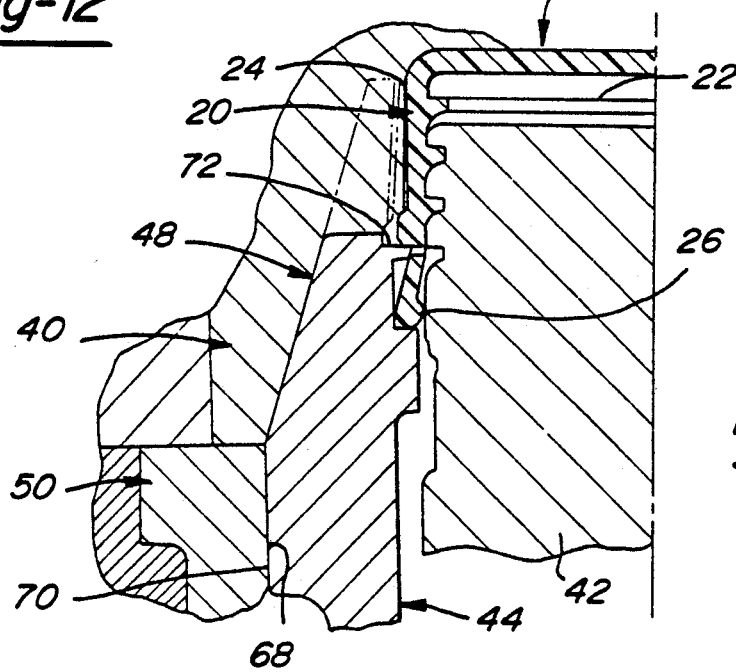
FIG. 14 is an enlarged fragmentary view in section taken at the encircled part 14 of FIG. 12 showing the collet expanded a predetermined amount providing clearance for the bead at the bottom of the tamper indicating band to be stripped from the core, with the core having been unthreaded a sufficient amount to effect this stripping, while the collet maintains its stripping contact with the bottom of the closure cap and tamper indicating band. The axially extending ribs on the closure maintain contact with the axially extending rib forming projections in the cavity mold to prevent rotation of the closure as the core is being unthreaded.

In FIG. 12 the collet jaw 48 has expanded radially outward this predetermined distance limited by abutment of the cylindrical collet sleeve surface 68 and cylindrical collet surface 70 as seen in FIGS. 12 and 14. The rib forming projections in the cavity mold acting against ribs 24 as best seen in FIG. 14, restrain the closure 10 from rotation as unthreading rotation of the core 42 takes place.

While there are no collet unthreading teeth in this embodiment, the window forming portion 72 of collet jaw 48 remains in contact with the bottom of the cap skirt 20 and contact is maintained between the jaw 48 and the bottom of the tamper indicating band to strip the closure 10 in synchronization with the axial movement of the core 42 during the unthreading rotation of core 42.

Figure 13:
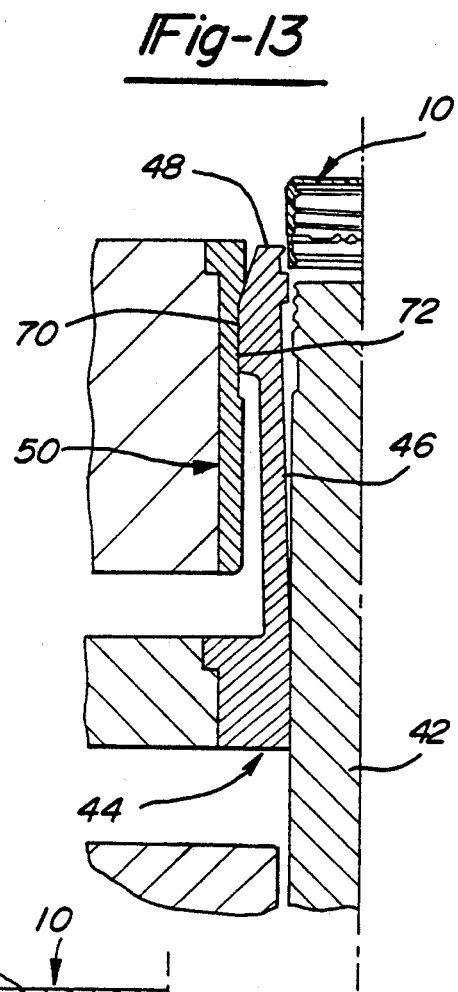

In FIG. 13 the core 42 has been completely unthreaded from the closure 10, and the collet sleeve 50 has been moved axially relative to the collet 44 so that the collet jaw 48 has moved outwardly an amount more than the predetermined amount to bring the collet surface 70 into abutment with the collet sleeve surface 72 releasing the collet from the closure for ejection as shown.

Figures 15, 16:
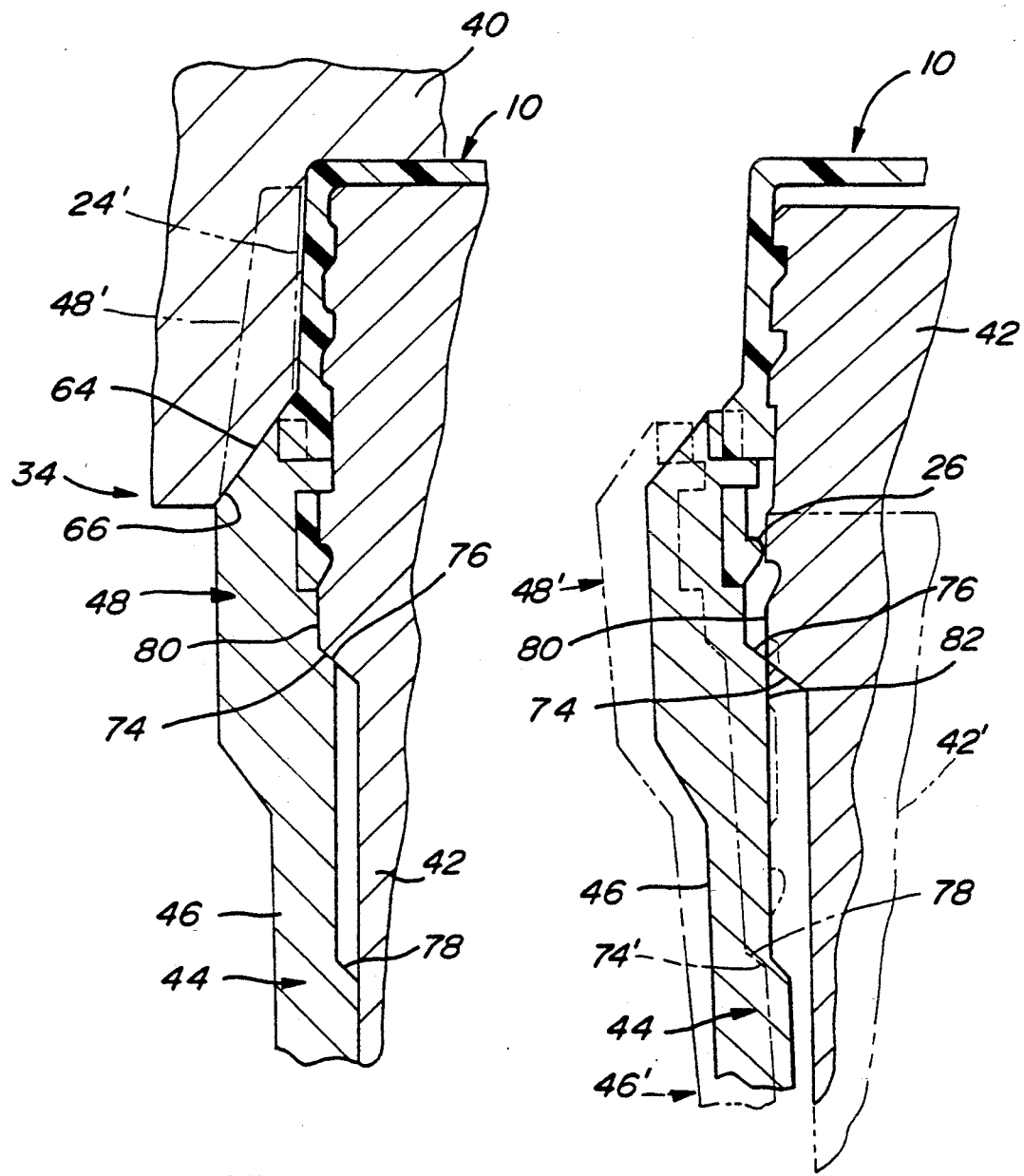
FIG. 15 is a cross-sectional view of the molding machine similar to FIGS. 3 and 10 showing the use of a camming surface on the core for forcing the collet open when the collet is biased inwardly, the machine being shown in a closed position with plastic having been injected into the molding cavity defined by the cavity mold, core and collet jaws, the collet jaws being held in their closed position by the cavity mold and the collet sleeve of FIGS. 3 and 10 being replaced by the camming surface on the core.
FIG. 16 is a cross-sectional view of the molding machine of FIG. 15 showing the collet expanded a predetermined amount by the camming surface on the core, providing clearance for the stripping of the inwardly directed bead on the tamper indicating band from the core, the collet jaws being held in this position by the force exerted by the camming surface on the core against the collet jaws in opposition to the inwardly directed bias of these jaws, and with the collet jaws maintaining contact with the bottom of the cap skirt and bottom of the tamper indicating band for stripping the closure as the core is being unthreaded.

Another collet unscrewing embodiment is shown in FIGS. 15 and 16 in which the collet fingers 46 are spring biased radially inwardly so that they are in their radially innermost position as the collet is advanced into the cavity mold 40. Here the abutment of the cooperating externally tapered surfaces 64 of the collet jaws 48 with the internally tapered surface 66 of the cavity mold 40 merely locks the collet in its molding cavity 36 defining position. Core 42 has a frusto-conical cam surface 74 which coacts with frusto-conical cam surfaces 76 and 78 on collet 44 to effect radially outward movement of collet jaws 48 when core 42 is moved axially relative to collet 48.

FIG. 15 shows the molding machine 34 in its closed position with the injection step having been completed to form closure 10.

As the core 42 is rotated in an unthreading direction the axial displacement of the core relative to the collet 44, as seen in FIG. 16, causes the core cam surface 74 to coact with the upper internal frusto-conical cam surface 76 of the collet, forcing the jaws 48 outward a predetermined amount to the position shown in full line where the bead 26 has cleared the core 42 and is stripped from it. This displacement a predetermined amount is maintained by the coaction of the cylindrical core surface 80 with the internal cylindrical collet surface 82. When the core has been completely unthreaded from the closure as shown in the phantom position at 42' in FIG. 16 the conical cam surface 74 on core 42 will have moved to its position shown at 74' to coact with the lower conical surface 78 on the collet to move the collet fingers 46 and jaws 48 to the position shown at 46' and 48' respectively. The collet jaws 48 are now free of the collet 42, for ejection of the closure 10.

It will be readily apparent from the foregoing description of the presently preferred embodiments of the invention that various modifications can be made to the overall molding process without departing from the essence of the invention as set forth in the claims.

The embodiments of the invention in which an exclusive property or privilege is claimed are defined as follows:

1. A method of molding a plastic tamper indicating closure having a threaded cap and a tamper indicating band joined to the bottom of the cap by a frangible connection, said method comprising the following steps:

a) providing a cavity mold defining an exterior portion of said cap;

b) providing a core defining an internal thread of said cap and an inwardly directed retaining element on said tamper indicating band;

c) providing a circumferential array of radially movable jaws concentrically around said core, said jaws, when in a radially innermost position, defining the exterior surface and bottom of said tamper indicating band, the bottom of said cap and the frangible connection between said tamper indicating band and the bottom of said cap;

d) axially moving said core and array of jaws into said cavity mold;

e) moving said jaws into their radially innermost position and locking said jaws in said position completing delineation of a molding cavity for said closure;

f) injecting plastic material into said molding cavity to form said closure;

g) moving said jaws radially outward a predetermined amount to provide clearance for stripping of the retaining element on said tamper indicating band from said core;

h) rotating said core in an unthreading direction while restraining rotation of said closure;

i) axially advancing said array of jaws while maintaining contact between each of said jaws and the bottom of the tamper indicating band and the bottom of the cap of said closure to strip said cap from said core as said core is being rotated; and j) moving said jaws radially outward a further, amount than the predetermined amount of step g) and ejecting said closure.

2. The method according to claim 1 wherein said movable jaws provided in step c) are biased outwardly, and movement of said jaws radially outward in step g) is obtained by axial movement of said cavity mold away from said circumferential array of jaws.

3. The method according to claim 2 wherein a sleeve is provided concentrically surrounding said array of jaws and said sleeve limits the radially outward movement of said jaws in step g) to said predetermined amount.

4. The method according to claim 3 wherein a collet is provided in step c) having axially extending fingers spring biased radially outward to form said circumferential array of radially movable jaws, and the spring bias moves said jaws radially outward said predetermined amount in step g).

5. The method according to claim 1 wherein a sleeve is provided concentrically surrounding said array of jaws and said sleeve limits the radially outward movement of said jaws in step g) to said predetermined amount.

6. The method according to claim 1 wherein said movable jaws provided in step c) are biased radially inward, and in step g) said jaws are moved radially outward against said bias.

7. The method according to claim 6 wherein said core provided in step b) has a cam surface so that movement of said jaws radially outward in step g) is obtained by axial movement of said core relative to jaws as said cam surface exerts an outward force on said jaws.

8. The method according to claim 7 wherein said axial movement of said core in step i) is obtained by rotation of said core in step h).

9. The method according to claim 7 wherein the outward movement of said jaws in step g) is limited to said predetermined amount by said cam surface.

10. The method according to claim 7 wherein a collet is provided in step c) having axially extending fingers spring biased radially inward to form said circumferential array of radially movable jaws and said cam surface forces said jaws radially outward against said spiring bias.

11. The method according to claim 1 wherein said core is provided with a cam surface in step b) and said jaws are moved radially outward said predetermined amount in step g) by axial movement of said core away from said circumferential array of jaws as said cam surface exerts an outward force on said jaws.

12. The method according to claim 1 wherein in step a) said cavity mold is provided with an internal frusto-conical surface, in step c) each of said array of jaws is provided with an external frusto-conical surface, and during the axial movement of step d), the external frusto-conical surface of said jaws contact the internal frusto-conical surface of said cavity mold causing radially inward movement and locking of said jaws according to step e).

13. The method according to claim 12 wherein in step g) said cavity mold is moved axially away with respect to said circumferential array of jaws, unlocking said jaws and permitting their radial outward movement.

14. The method according to claim 1 wherein in step c) said jaws further define axially extending unthreading teeth on the bottom of said cap which remain engaged with said jaws as tile jaws are moved outwardly in step g) and wherein such engagement restrains rotation of said closure during step h).

15. The method according to claim 14 wherein said unthreading teeth are disengaged from said jaw in step j).

16. The method according to claim 14 wherein in step g) said cavity mold is moved axially with respect to said circumferential array of said jaws so that the cavity mold lies axially beyond said closure permitting ejection of said closure in step j).

17. The method according to claim 14 wherein in step c) each of said jaws further define a substantial portion of the exterior wall of said cap.

18. The method according to claim 1 wherein in step a) said cavity mold defines a circumferential array of axially extending ribs on the exterior portion of said cap, and said ribs remain engaged with said cavity mold, restraining rotation of said closure during step h).

19. The method according to claim 18 wherein in step i) said cavity mold is axially advanced with said array of jaws, retaining rotation restraining contact between said ribs and said cavity mold.

20. The method according to claim 19 wherein after step i) said cavity mold is moved axially away with respect to said circumferential array of jaws so that the cavity mold disengages said cap ribs and lies beyond said closure permitting ejection of said closure in step j).

21. A method of molding a plastic tamper indicating closure having a threaded cap and a tamper indicating band joined to the bottom of the cap by a frangible connection, said method comprising the following steps:

a providing a cavity mold defining an exterior portion of said cap;

b) providing a core defining an internal thread of said cap and an inwardly directed retaining element on said tamper indicating band;

c) providing a collet concentrically around said core having radially spring biased axially extending fingers forming a circumferential array of jaws, the collet when in its closed position, defining the exterior surface and bottom of said tamper indicating band, the bottom of said cap with a plurality of unthreading teeth and the frangible connection between said tamper indicating band and the bottom of said cap;

d) axially moving said core and said collet into said cavity mold and closing said collet thereby defining a molding cavity for said closure;

e) injecting plastic material into said molding cavity to form said closure;

f) moving said cavity mold axially with respect to said collet so that said cavity mold lies axially beyond said closure;

g) partially opening said collet a predetermined amount to provide clearance for stripping of the retaining element on said tamper indicating band from said core but maintaining engagement of the jaws with the plurality of unthreading teeth;

h) rotating said core in an unthreading direction while said unthreading teeth restrain rotation of said closure;

i) axially advancing said collet' while maintaining contact between each of said jaws and the bottom of the tamper indicating band and the bottom of the cap of said closure to strip said cap from said core as said core is being rotated; and j) opening said collet a further amount than the predetermined amount of step g) disengaging said unthreading teeth from said closure and ejecting said closure.

22. The method according to claim 21 wherein said collet fingers provided in step c) are spring biased outwardly and a sleeve concentrically surrounding said collet is provided limiting the partial opening of the collet by the outward spring bias in step g) to said predetermined amount, and said sleeve is axially moved relative to said collet in step j) allowing further opening of the collet by the force of said outward spring bias.

23. The method according to claim 21 wherein said collet fingers provided in step c) are spring biased inwardly and said core provided in step b) has a cam surface so that partial opening of said collet in step g) is obtained by axial movement of said core away from said circumferential array of jaws as said cam surface exerts an outward force on said jaws, and said core is axially moved a further amount in step j) opening said collet a further amount than the predetermined amount of step g) as said cam surface exerts an outward force on said jaws, disengaging said unthreading teeth from said closure.

24. A method of molding a plastic tamper indicating closure having a threaded cap and a tamper indicating band joined to the bottom of the cap by a frangible connection, said method comprising the following steps:

a) providing a cavity mold defining an exterior portion of said cap with a circumferential array of axially extending ribs;

b) providing a core defining an internal thread of said cap and an inwardly directed retaining element on said tamper indicating band;

c) providing a collet concentrically around said core having radially spring biased axially extending fingers forming a circumferential array of jaws when the collet is in its closed position, defining the exterior surface and bottom of said tamper indicating band, the bottom of said cap and the frangible connection between said tamper indicating band and the bottom of said cap;

d) axially moving said core and said collet into said cavity mold and closing said collet thereby defining a molding cavity for said closure;

e) injecting plastic material into said molding cavity to form said closure;

f) moving said cavity mold axially with respect to said collet so as to release the collet jaws from their closed position but maintaining engagement of said ribs with the cavity mold;

g) partially opening said collet a predetermined amount to provide clearance for stripping of the retaining element on said tamper indicating band from said core but maintaining engagement of the jaws with the bottom of the cap and the bottom of the tamper indicating band;

h) rotating said core in an unthreading direction of said closure while said ribs restrain rotation of said closure;

i) axially advancing said collet while maintaining contact between each of said jaws and the bottom of the tamper indicating band and the bottom of the cap of said closure to strip said closure from said core as said core is being rotated;

j) axially moving said cavity mold away from said collet, releasing said cap ribs; and k) opening said collet a further amount than the predetermined amount of step g) disengaging said collet from the bottom of said cap and the bottom of said tamper indicating band and ejecting said closure.

25. The method according to claim 24 wherein said collet fingers provided in step c) are spring biased outwardly and a sleeve concentrically surrounding said collet is provided limiting the partial opening of the collet by the outward spring bias in step g) to said predetermined amount, and said sleeve is axially moved relative to said collet in step j) allowing further opening of the collet by the force of said outward spring bias.

26. The method according to claim 24 wherein said collet fingers provided in step c) are spring biased inwardly and said core provided in step b) has a cam surface so that partial opening of said collet in step g) is obtained by axial movement of said core away from said circumferential array of jaws as said cam surface exerts an outward force on said jaws, and said core is axially moved a further amount in step j) opening said collet a further amount than the predetermined amount of step g) as said cam surface exerts an outward force on said jaws, disengaging said unthreading teeth from said closure.

* * * * *